United States Patent
Xu et al.

(10) Patent No.: US 12,426,100 B2
(45) Date of Patent: Sep. 23, 2025

(54) SEQUENCE SENDING METHOD AND APPARATUS

(71) Applicant: HUAWEI TECHNOLOGIES CO., LTD., Shenzhen (CN)

(72) Inventors: Xiuqiang Xu, Shanghai (CN); Yunhao Zhang, Shanghai (CN); Yiqun Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 344 days.

(21) Appl. No.: 18/317,311

(22) Filed: May 15, 2023

(65) Prior Publication Data
US 2023/0292378 A1   Sep. 14, 2023

Related U.S. Application Data

(63) Continuation of application No. PCT/CN2020/129086, filed on Nov. 16, 2020.

(51) Int. Cl.
*H04W 74/0833* (2024.01)
*H04W 74/0836* (2024.01)

(52) U.S. Cl.
CPC ..... *H04W 74/085* (2013.01); *H04W 74/0833* (2013.01); *H04W 74/0836* (2024.01)

(58) Field of Classification Search
CPC ........... H04W 74/085; H04W 74/0833; H04W 74/0836
See application file for complete search history.

(56) References Cited

U.S. PATENT DOCUMENTS

| 9,769,699 B2 * | 9/2017 | Tseng ............... H04W 28/0278 |
| 2011/0009138 A1 * | 1/2011 | Kim ...................... H04L 5/0007 |
| | | 455/507 |

(Continued)

FOREIGN PATENT DOCUMENTS

| CN | 104917544 A | 9/2015 |
| CN | 104935536 A | 9/2015 |

(Continued)

OTHER PUBLICATIONS

Huawei et al., "Discussion on Doppler compensation, timing advance and RACH for NTN", 3GPP Draft; R1-1911860,Nov. 9, 2019, XP051823042, 14 pages.

*Primary Examiner* — Ajay Cattungal
(74) *Attorney, Agent, or Firm* — Maier & Maier, PLLC

(57) ABSTRACT

A sequence sending method and an apparatus, to reduce a probability of a sequence conflict. The method includes: a terminal device sends, in a first time period, a first sequence to a network device, where the first sequence is determined based on a first parameter; the terminal device performs scrambling processing on a second sequence based on the first parameter, to generate a scrambled second sequence; the terminal device sends, in a second time period, the scrambled second sequence to the network device; the terminal device performs scrambling processing on an $N^{th}$ sequence based on an $(N-1)^{th}$ parameter, to generate a scrambled $N^{th}$ sequence, where an $(N-1)^{th}$ sequence is determined based on the $(N-1)^{th}$ parameter, and N is an integer greater than 2; and the terminal device sends, in an $N^{th}$ time period, the scrambled $N^{th}$ sequence to the network device.

15 Claims, 5 Drawing Sheets

(56) References Cited

U.S. PATENT DOCUMENTS

| | | | |
|---|---|---|---|
| 2013/0051373 A1* | 2/2013 | Ro | H04W 48/16 370/336 |
| 2014/0323126 A1* | 10/2014 | Ro | H04L 27/2655 455/434 |
| 2015/0215763 A1* | 7/2015 | Ro | H04L 27/2657 455/552.1 |
| 2017/0230155 A1 | 8/2017 | Lee et al. | |
| 2018/0262308 A1* | 9/2018 | Si | H04W 56/0005 |
| 2019/0387485 A1* | 12/2019 | Ko | H04J 11/0069 |
| 2020/0015177 A1* | 1/2020 | Kim | H04L 27/261 |
| 2020/0187159 A1* | 6/2020 | Ko | H04L 5/0051 |
| 2020/0275393 A1* | 8/2020 | Shin | H04J 11/0073 |
| 2021/0105783 A1* | 4/2021 | Wang | H04L 5/0094 |
| 2021/0219333 A1* | 7/2021 | Xu | H04W 72/0453 |
| 2021/0306191 A1* | 9/2021 | Lin | H04L 1/0061 |
| 2022/0006552 A1* | 1/2022 | Ghozlan | H04J 11/0056 |

FOREIGN PATENT DOCUMENTS

| | | |
|---|---|---|
| CN | 108650001 A | 10/2018 |
| CN | 112134660 A | 12/2020 |
| CN | 112398608 A | 2/2021 |
| EP | 3606224 A1 | 2/2020 |
| WO | 2020143386 A1 | 7/2020 |

\* cited by examiner

SEQUENCE SENDING METHOD AND APPARATUS

CROSS-REFERENCE TO RELATED APPLICATIONS

This application is a continuation of International Application No. PCT/CN2020/129086, filed on Nov. 16, 2020, the disclosure of which is hereby incorporated by reference in its entirety.

TECHNICAL FIELD

The embodiments relate to the communication field, a sequence sending method, and an apparatus.

BACKGROUND

In a conventional cellular network mobile communication system, for example, a long term evolution (LTE) system or a new radio (new radio, NR) system, there may be a plurality of types of terminals, for example, an enhanced mobile broadband (eMBB) terminal, an ultra-reliable low latency communication (URLLC) terminal, and a massive machine type communication (mMTC) terminal. The three terminals respectively correspond to three scenarios: an eMBB scenario, a URLLC scenario, and an mMTC scenario.

A characteristic of the mMTC scenario is that there are a large quantity of terminals, a small data packet, and a large packet arrival interval. For example, there are tens of thousands to millions of terminals per square kilometer, a data packet arrival interval of each terminal is several hours or even several days, and a size of each packet is several to dozens of bytes. In an uplink transmission process, a terminal device needs to send a random access preamble to a base station. After detecting the preamble, the base station sends a random access response (RAR) message to the terminal device. The terminal device sends uplink data based on the RAR message.

The preamble may be a sequence. When more than one terminal sends same sequences on a same time-frequency resource, to be specific, when a sequence conflict occurs, performance of detecting the terminal by the base station deteriorates. For example, the base station fails to detect the sequence, or the base station detects the sequence but cannot determine a quantity of terminals which send the sequence. This affects sending and receiving of the uplink data. When a quantity of available sequences is fixed, a larger quantity of terminals indicates that a sequence conflict is more likely to occur.

SUMMARY

The embodiments may provide a sequence sending method and an apparatus, to reduce a probability of a sequence conflict.

According to a first aspect, a sequence sending method is provided and the method is applied to random access of a terminal device. The method includes: The terminal device sends, in a first time period, a first sequence to a network device, where the first sequence is determined based on a first parameter; the terminal device performs scrambling processing on a second sequence based on the first parameter, to generate a scrambled second sequence; the terminal device sends, in a second time period, the scrambled second sequence to the network device; the terminal device performs scrambling processing on an $N^{th}$ sequence based on an $(N-1)^{th}$ parameter, to generate a scrambled $N^{th}$ sequence, where an $(N-1)^{th}$ sequence is determined based on the $(N-1)^{th}$ parameter, and N is an integer greater than 2; and the terminal device sends, in an $N^{th}$ time period, the scrambled $N^{th}$ sequence to the network device.

Based on the foregoing solution, the terminal device may separately send at least three sequences, including the first sequence, the second sequence, and the $N^{th}$ sequence, to the network device in different time periods. The first sequence, the second sequence, and the $N^{th}$ sequence are randomly selected by the terminal device from a resource pool. If a total quantity of available sequences in the resource pool is Q, a quantity of available sequence combinations is at least $Q^3$. Therefore, the total quantity of available sequences is increased, and a probability of a sequence conflict can be reduced.

In a possible implementation, the method further includes: The terminal device receives indication information sent by the network device; and the terminal device selects the first sequence, the second sequence, the $(N-1)^{th}$ sequence, and the $N^{th}$ sequence from the resource pool based on the indication information.

In a possible implementation, that the terminal device performs scrambling processing on a second sequence based on the first parameter, to generate a scrambled second sequence includes: The terminal device generates a first scrambling sequence based on the first parameter; and the terminal device performs scrambling processing on the second sequence based on the first scrambling sequence, to generate the scrambled second sequence.

In a possible implementation, the method further includes: The terminal device receives a random access response message sent by the network device.

In a possible implementation, the first sequence, the second sequence, the $N^{th}$ sequence, and the first scrambling sequence are any one of the following sequences: a Zadoff-Chu (ZC) sequence, a longest linear shift register m sequence, a pseudo noise (PN) sequence, a discrete Fourier transform (DFT) sequence, an Alltop sequence, or a Gold sequence.

According to a second aspect, a sequence sending method is provided and the method is applied to random access of a terminal device. The method includes: A network device receives, in a first time period, a first sequence sent by the terminal device, where the first sequence is determined based on a first parameter; the network device receives, in a second time period, a scrambled second sequence sent by the terminal device, where the scrambled second sequence is a sequence obtained by performing, by the terminal device, scrambling processing on a second sequence based on the first parameter; the network device descrambles the scrambled second sequence based on the first parameter, to obtain the second sequence; the network device receives, in an $N^{th}$ time period, a scrambled $N^{th}$ sequence sent by the terminal device, where the scrambled $N^{th}$ sequence is a sequence obtained by performing, by the terminal device, scrambling processing on an $N^{th}$ sequence based on an $(N-1)^{th}$ parameter, an $(N-1)^{th}$ sequence is determined based on the $(N-1)^{th}$ parameter, and N is an integer greater than 2; and the network device descrambles the scrambled $N^{th}$ sequence based on the $(N-1)^{th}$ parameter, to obtain the $N^{th}$ sequence.

In a possible implementation, the method further includes: The network device sends indication information to the terminal device, where the indication information indicates the terminal device to select the first sequence, the second sequence, the $(N-1)^{th}$ sequence, and the $N^{th}$ sequence from a resource pool.

In a possible implementation, that the network device descrambles the scrambled second sequence based on the first parameter, to obtain the second sequence includes: The network device generates a first descrambling sequence based on the first parameter; and the network device descrambles the scrambled second sequence based on the first descrambling sequence, to obtain the second sequence.

In a possible implementation, the method further includes: The network device sends a random access response message to the terminal device based on the first sequence, the second sequence, and the $N^{th}$ sequence.

In a possible implementation, the first sequence, the second sequence, the $N^{th}$ sequence, and the first descrambling sequence are any one of the following sequences: a Zadoff-Chu (ZC) sequence, a longest linear shift register m sequence, a pseudo noise (PN) sequence, a discrete Fourier transform (DFT) sequence, an Alltop sequence, or a Gold sequence.

According to a third aspect, a sequence sending method is provided and the method is applied to random access of a terminal device. The method includes: The terminal device sends, in a first time period, M sequences to a network device, where the M sequences include a first sequence to an $M^{th}$ longest linear shift register sequence, the M sequences are respectively determined based on M parameters, the M parameters correspond one-to-one to the M sequences, and M is an integer greater than or equal to 2; the terminal device performs scrambling processing on an $N^{th}$ sequence based on the M parameters, to generate a scrambled $N^{th}$ sequence, where N is equal to M+1; and the terminal device sends, in a second time period, the scrambled $N^{th}$ sequence to the network device.

Based on the foregoing solution, the terminal device may send at least two sequences to the network device in the first time period and may send one sequence to the network device in the second time period. Sequences sent in a same time period are different, and sequences sent in different time periods may be the same or may be different. If a total quantity of available sequences in a resource pool is Q, a quantity of available sequence combinations is at least $Q^2(Q-1)$. Therefore, the total quantity of available sequences is increased, and a probability of a sequence conflict can be reduced.

In a possible implementation, the method further includes: The terminal device receives indication information sent by the network device; and the terminal device selects the M sequences and the $N^{th}$ sequence from the resource pool based on the indication information.

In a possible implementation, that the terminal device performs scrambling processing on an $N^{th}$ sequence based on the M parameters, to generate a scrambled $N^{th}$ sequence includes: The terminal device generates an $N^{th}$ scrambling sequence based on the M parameters; and the terminal device performs scrambling processing on the $N^{th}$ sequence based on the $N^{th}$ scrambling sequence, to generate the scrambled $N^{th}$ sequence.

In a possible implementation, the method further includes: The terminal device receives a random access response message sent by the network device.

In a possible implementation, the M sequences, the $N^{th}$ sequence, and the second scrambling sequence are any one of the following sequences: a Zadoff-Chu (ZC) sequence, a longest linear shift register m sequence, a pseudo noise (PN) sequence, a discrete Fourier transform (DFT) sequence, an Alltop sequence, or a Gold sequence.

According to a fourth aspect, a sequence sending method is provided and the method is applied to random access of a terminal device. The method includes: A network device receives, in a first time period, M sequences sent by the terminal device, where the M sequences includes a first sequence to an $M^{th}$ longest linear shift register sequence, the M sequences are respectively determined based on M parameters, the M parameters correspond one-to-one to the M sequences, and M is an integer greater than or equal to 2; the network device receives, in a second time period, a scrambled $N^{th}$ sequence sent by the terminal device, where the scrambled $N^{th}$ sequence is a sequence obtained by performing, by the terminal device, scrambling processing on an $N^{th}$ sequence based on the M parameters, and N is equal to M+1; and the network device descrambles the scrambled $N^{th}$ sequence based on the M parameters, to obtain the $N^{th}$ sequence.

In a possible implementation, the method further includes: The network device sends indication information to the terminal device, where the indication information indicates the terminal device to select the M sequences and the $N^{th}$ sequence from a resource pool.

In a possible implementation, that the network device descrambles the scrambled $N^{th}$ sequence based on the M parameters, to obtain the $N^{th}$ sequence includes: The network device generates an $N^{th}$ descrambling sequence based on the M parameters; and the network device descrambles the scrambled $N^{th}$ sequence based on the $N^{th}$ descrambling sequence, to obtain the $N^{th}$ sequence.

In a possible implementation, the method further includes: The network device sends a random access response message to the terminal device based on the M sequences and the $N^{th}$ sequence.

In a possible implementation, the M sequences, the $N^{th}$ sequence, and the second descrambling sequence are any one of the following sequences: a Zadoff-Chu (ZC) sequence, a longest linear shift register m sequence, a pseudo noise (PN) sequence, a discrete Fourier transform (DFT) sequence, an Alltop sequence, or a Gold sequence.

According to a fifth aspect, a communication apparatus is provided. The communication apparatus includes units configured to implement functions of the method according to any one of the first aspect or the possible implementations of the first aspect.

According to a sixth aspect, a communication apparatus is provided. The communication apparatus includes units configured to implement functions of the method according to any one of the second aspect or the possible implementations of the second aspect.

According to a seventh aspect, a communication apparatus is provided. The communication apparatus includes units configured to implement functions of the method according to any one of the third aspect or the possible implementations of the third aspect.

According to an eighth aspect, a communication apparatus is provided. The communication apparatus includes units configured to implement functions of the method according to any one of the fourth aspect or the possible implementations of the fourth aspect.

According to a ninth aspect, a communication device is provided. The communication device includes a processor and a transceiver. The transceiver is configured to: receive computer code or instructions and transmit the computer code or the instructions to the processor. The processor runs the computer code or the instructions, to implement the method according to any one of the first aspect or the possible implementations of the first aspect.

According to a tenth aspect, a communication device is provided. The communication device includes a processor and a transceiver. The transceiver is configured to: receive computer code or instructions and transmit the computer code or the instructions to the processor. The processor runs the computer code or the instructions, to implement the method according to any one of the second aspect or the possible implementations of the second aspect.

According to an eleventh aspect, a communication device is provided. The communication device includes a processor and a transceiver. The transceiver is configured to: receive computer code or instructions and transmit the computer code or the instructions to the processor. The processor runs the computer code or the instructions, to implement the method according to any one of the third aspect or the possible implementations of the third aspect.

According to a twelfth aspect, a communication device is provided. The communication device includes a processor and a transceiver. The transceiver is configured to: receive computer code or instructions and transmit the computer code or the instructions to the processor. The processor runs the computer code or the instructions, to implement the method according to any one of the fourth aspect or the possible implementations of the fourth aspect.

According to a thirteenth aspect, a communication system is provided. The communication system includes the terminal device and the network device in the method according to the first aspect, the second aspect, the third aspect, or the fourth aspect.

According to a fourteenth aspect, a non-transitory computer-readable storage medium is provided. The non-transitory computer-readable storage medium stores a computer program. When the computer program is run on a computer, the computer is enabled to perform the method according to any one of the first aspect to the fourth aspect or the possible implementations of the first aspect to the fourth aspect.

DETAILED DESCRIPTION OF THE EMBODIMENTS

Figure 1:
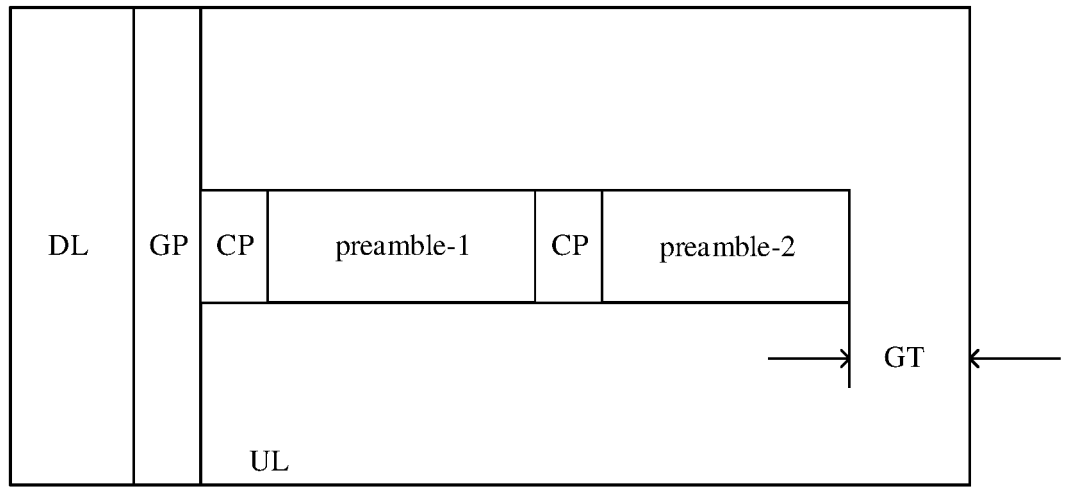
FIG. 1 is a schematic diagram of a 2-stage-based preamble sending solution.

The following describes the embodiments with reference to accompanying drawings.

The embodiments may be applied to various communication systems, for example, a sidelink communication system, a vehicle to everything (V2X) system, a wireless local area network (WLAN) system, a narrowband Internet of things NB-IoT) system, a global system for mobile communications (GSM), an enhanced data rates for GSM evolution (EDGE) system, a wideband code division multiple access (WCDMA) system, a code division multiple access 2000 (CDMA2000) system, a time division-synchronization code division multiple access (TD-SCDMA) system, a long term evolution (LTE) system, satellite communication, a 5th generation (5G) system, or a new communication system that appears in the future.

A terminal device in the embodiments may be a device that includes a wireless transceiver function and that can provide a communication service for a user. The terminal device may be a device in a V2X system, a device in a device to device (D2D) system, a device in a machine type communication (MTC) system, or the like. The terminal device may include various handheld devices, vehicle-mounted devices, wearable devices, or computing devices that have a wireless communication function, or other processing devices connected to a wireless modem. A terminal may be a mobile station (MS), a subscriber unit, user equipment (UE), a cellular phone, a cordless phone, a session initiation protocol (SIP) phone, a wireless local loop (WLL) station, a smartphone, a wireless data card, a personal digital assistant (PDA) computer, a tablet computer, a wireless modem, a handset device, a laptop computer, a machine type communication (MTC) terminal, or the like.

In a conventional cellular network mobile communication system, for example, an LTE system or a new radio (NR) system, there may be a plurality of types of terminals, for example, an enhanced mobile broadband (eMBB) terminal, an ultra-reliable low-latency communication (URLLC) terminal, and a massive machine type communication (mMTC) terminal. The terminals respectively correspond to three scenarios: an eMBB scenario, a URLLC scenario, and an mMTC scenario.

A characteristic of the mMTC scenario may be that there are a large quantity of terminals, a small data packet, and a large packet arrival interval. For example, there are tens of thousands to millions of terminals per square kilometer, a data packet arrival interval of each terminal is several hours or even several days, and a size of each packet is several to dozens of bytes. In this scenario, a conventional scheduling-based uplink transmission method is not suitable because in conventional scheduling-based uplink transmission, a terminal first needs to enter a connected state through random access (RA), sends a scheduling request (SR) to a base station, then monitors an uplink grant sent by the base station, and sends a data packet to the base station based on scheduling information in the uplink grant. In this process, the terminal consumes a large quantity of delays and power for establishing a connection, sending the SR, monitoring the scheduling information, and the like, and duration used for actual data transmission is very short, resulting in extremely low data transmission efficiency. In this case, a more efficient uplink small-packet transmission method may be considered, for example, uplink grant-free (GF) transmission, early data transmission (EDT), and 2-step random access channel (RACH).

The uplink grant-free transmission means that a terminal sends an uplink data packet to a base station on a physical uplink shared channel (PUSCH) resource preconfigured by the base station and does not need to monitor a dynamic grant of the base station before sending the data packet. The PUSCH also includes a pilot signal, for example, a demodulation reference signal (DMRS). The pilot signal is used by the base station to detect whether the terminal sends data. For example, when detecting a reference signal, the base station considers that a terminal sends data by using the reference signal, and the base station may estimate an uplink shared channel based on the detected reference signal and demodulate the terminal data. Therefore, sending of the reference signal plays an important role in the uplink grant-free transmission.

The early data transmission is a method for sending uplink data in a 4-step random access process. When a terminal needs to send data, the terminal sends a Msg1 to a base station, such as, sends a random access preamble on a physical random access channel (PRACH). After detecting the preamble, the base station sends a Msg2, such as, a random access response (RAR) message, to the terminal, where the RAR carries timing advance (TA) and an uplink grant used for scheduling a Msg3. After monitoring the RAR message, the terminal sends the Msg3 based on the uplink grant in the RAR message, where the Msg3 carries the uplink data. After receiving the Msg3, the base station sends a contention resolution message to the terminal. A difference between the EDT and conventional 4-step random access is that the Msg3 in the EDT may carry the uplink data, but in a conventional 4-step random access process, the terminal cannot send the uplink data to the base station. It can be learned from the EDT process that sending and detection of the preamble are critical, because the base station can send the RAR message for the preamble only after detecting the preamble, and then the terminal can send the Msg3 carrying the data.

The 2-step random access is a further simplified uplink small-packet transmission method for the early data transmission. The 2-step RACH includes two steps: a MsgA and a MsgB. When a terminal needs to send data, the terminal sends the MsgA to a base station. The MsgA includes two parts: a PRACH and a PUSCH. The PRACH carries a preamble, the PUSCH carries uplink data, and the PUSCH further includes a DMRS, where the DMRS is used by the base station to perform channel estimation. After the base station detects the MsgA (detection of the MsgA is detection of the preamble), if the base station also correctly receives the data in the MsgA, the base station sends the MsgB, where the MsgB includes a contention resolution message. When the base station detects the MsgA but does not correctly receive the uplink data in the MsgA, the base station may send an RAR message to the terminal to schedule the terminal to retransmit the uplink data. Similarly, the sending and detection of the preamble are also important for the 2-step RACH.

Both the DMRS and the preamble may be sequences. When more than one terminal sends a same sequence on a same time-frequency resource, such as, when a sequence conflict occurs, performance of detecting the terminal by the base station deteriorates. For example, the base station fails to detect the sequence, or the base station detects the sequence but cannot determine a quantity of terminals which send the sequence. This affects sending and receiving of the uplink data. When a quantity of available sequences is fixed, a larger quantity of terminals indicates that a sequence conflict is more likely to occur.

The preamble in the random access process may use a Zadoff-Chu (ZC) sequence:

$$x_{u,v}(n) = x_u((n + C_v)\mathrm{mod} L_{RA})$$

$$x_u(i) = e^{-j\frac{\pi u i(i+1)}{L_{RA}}}, i = 0, 1, \ldots, L_{RA} - 1$$

$L_{RA}$ is a prime number, n is a sequence length, u is a root sequence index, v is a cyclic shift index, $x_u(i)$ is a root sequence determined based on the root sequence index, $C_v$ is a cyclic shift value, and $C_v$=Ncs*v, where Ncs is a cyclic shift interval, and Ncs is greater than or equal to 0. The terminal device determines the root sequence based on the root sequence index configured by the base station, and then determines different preamble sequences based on different cyclic shift values.

Each cell in both the NR system and the LTE system supports a maximum of 64 preamble sequences. A quantity of preamble sequences that can be generated by each root sequence is determined based on the cyclic shift interval. When a quantity of preamble sequences generated by one root sequence is less than 64, the terminal continues to generate preamble sequences based on another root sequence until the quantity of preambles reaches 64. It can be learned that a quantity Q of preambles that can be determined depends on two factors: one is a quantity n of root sequences, and the other is a quantity K of preambles that can be generated by each root sequence. In other words, the total quantity Q of preamble sequences that can be generated is equal to n*K.

Considering that preamble sequences generated by different root sequences are not orthogonal to each other, a same cell may be prevented from using a plurality of root sequences. In this case, a total quantity of available preamble sequences for each cell is limited, for example, 64 in the LTE system and the NR system. In this case, a preamble sent by the terminal when the terminal performs 4-step random access, 2-step random access, or early data transmission may be randomly selected from all available preambles. Therefore, for a large quantity of terminals, a probability that more than one terminal selects a same preamble may be high, and consequently, detection performed by the base station may fail.

Currently, a 2-stage-based preamble sending solution is provided, so that the quantity of available preambles can be increased to $Q^2$. FIG. 1 is a schematic diagram of a 2-stage-based preamble sending solution. A method is as follows. A terminal device sends two sequences, namely, a preamble-1 and a preamble-2 in two time periods. For example, the Msg1 in 4-step random access or EDT includes two PRACH sending occasions, and one preamble is sent on each PRACH occasion. The base station detects preamble sequences in the two time periods. If the base station separately detects the preamble-1 and the preamble-2 in the two time periods, the base station determines that a terminal device sends a combination of the preamble-1 and the preamble-2.

The preamble-1 and the preamble-2 cannot be randomly selected. Otherwise, a false alarm occurs on a base station side. For example, it is assumed that indexes (numbers) of a preamble-1 and a preamble-2 that are randomly selected by a terminal device 1 from a preamble resource pool are respectively x1 and y1, and indexes (numbers) of two preambles that are randomly selected by a terminal device 2 from the resource pool are respectively x2 and y2. The base station device detects preambles whose indexes are x1 and x2 in a time period 1 and detects preambles whose indexes are y1 and y2 in a time period 2. In this case, the base station cannot determine whether a terminal device selects a combination of the preambles whose indexes are respectively x1 and y2 or x2 and y1. To avoid the false alarm, the following method for determining the preamble-1 and the preamble-2 is provided. Steps include:

(1) the terminal randomly selects the preamble-1 from the preamble resource pool;

(2) the terminal randomly selects a preamble-x from the preamble resource pool, calculates an S sequence based on the index of the preamble-1 in the resource pool, and scrambles the preamble-x by using the obtained S sequence (where herein the scrambling processing may be that a corresponding element in the S sequence is multiplied by a corresponding element in the preamble-x), to obtain the preamble-2; and (3) the terminal sends the preamble-1 in the time period 1 and sends the preamble-2 in the time period 2.

After detecting the preamble-1 in the time period 1, the base station determines the S sequence according to a same rule. The base station descrambles, by using the obtained S sequence, a signal received in the time period 2, and then detects the preamble-x from the signal.

Because generation of the preamble-2 is related to the preamble-1, the false alarm can be avoided. For example, assuming that an index of a preamble-1 selected by the terminal device 1 in the time period 1 is x1, an index of a preamble-x selected in the time period 2 is y1, and an S sequence determined by the terminal device based on x1 is s1, the terminal device determines a preamble-2 based on s1 and the preamble whose index is y1. In addition, assuming that an index of a preamble-1 selected by the terminal device 2 in the time period 1 is x2, an index of a preamble-x selected in the time period 2 is y2, and an S sequence determined by the terminal device based on x2 is s2, the terminal determines a preamble-2 based on s2 and the preamble whose index is y2. The base station side detects the preambles whose indexes are x1 and x2 in the time period 1, then detects, based on s1, the preamble-x whose index is y1 in the time period 2, and detects, based on s2, the preamble-2 whose index is y2 in the time period 2. In this way, the base station determines that there is no terminal 3 that separately selects a combination of the preamble whose index is x1 and the preamble whose index is y2 in both the time period 1 and the time period 2, because the base station fails to detect, based on s1, the preamble whose index is y2 in the time period 2. In addition, because the preamble-x used for generating the preamble-2 is also randomly selected by the terminal from the sequence resource pool, in this method, the total quantity of available sequences may be increased from Q to $Q^2$.

On a 2-phase PRACH, although the total quantity of available sequences may be increased from Q to $Q^2$, when Q is small, for example, when a cell radius is large and a subcarrier spacing is large, a quantity of available preamble sequences in a single cell is small, and a probability of a preamble conflict is still high.

Therefore, the embodiments may provide a sequence sending method, so that when a sequence resource pool is given, a quantity of available sequences can be increased, and a probability of a sequence conflict can be reduced.

The solutions may be applied to a 5G NR system, or may be applied to another communication system, provided that an entity in the communication system sends configuration information to another entity and sends data to the another entity, or receives data sent by another entity; and the another entity receives the configuration information sent by the entity, and sends data to the entity based on the configuration information, or receives the data sent by the entity.

Figure 2:
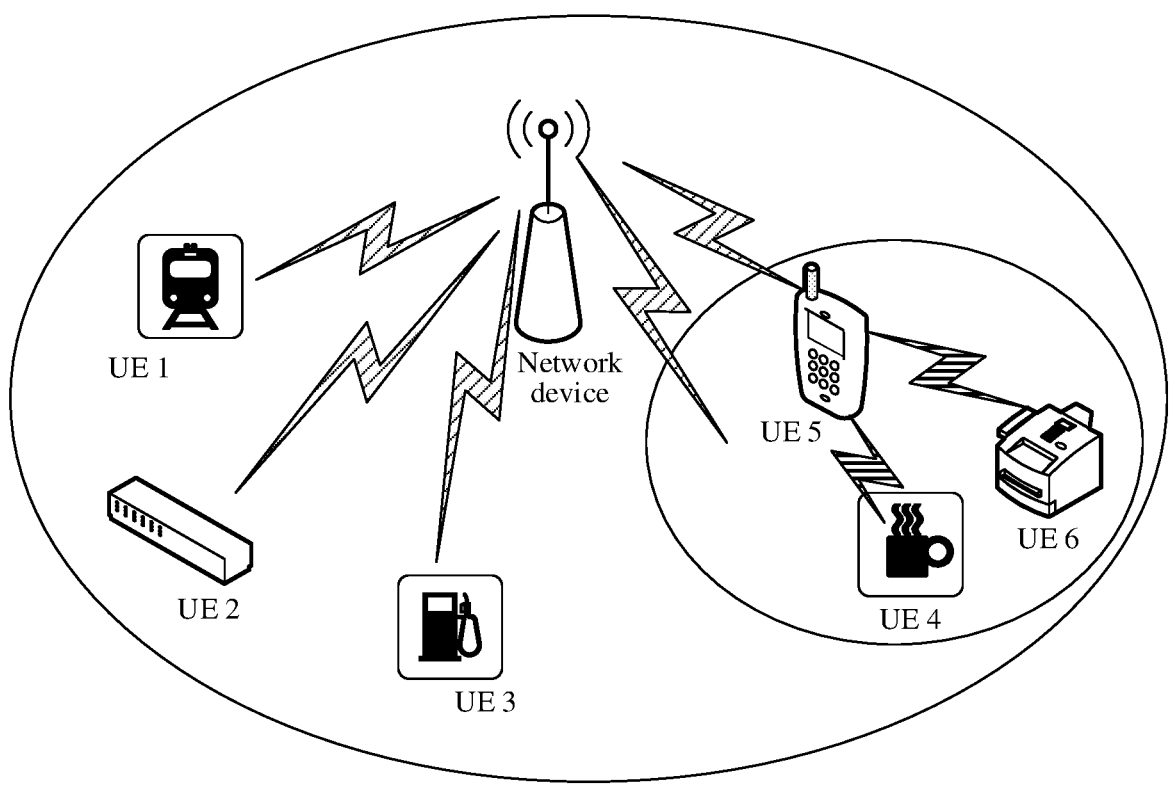
FIG. 2 is a schematic diagram of an applicable communication system.

FIG. 2 is a schematic diagram of an applicable communication system. When a sending entity of configuration information is a network entity, and a receiving entity of the configuration information is a terminal device, for example, UE, a network device and UE 1 to UE 6 form a communication system. In the communication system, the UE 1 to the UE 6 may send uplink data to the network device, and the network device needs to receive the uplink data sent by the UE 1 to the UE 6. In addition, the network device may send the configuration information to the UE 1 to the UE 6.

In addition, the UE 4 to the UE 6 may also form a communication system. In this case, both a sending entity and a receiving entity of configuration information may be terminal devices. For example, in an Internet of Vehicles system, a terminal device 1 sends configuration information to a terminal device 2, and receives data sent by the terminal device 2. The terminal device 2 receives the configuration information sent by the terminal device 1 and sends the data to the terminal device 1.

For a transmission scenario, the embodiments may be used for random access, including 2-step-based random access 2-step RACH, 4-step-based random access 4-step RACH, 4-step-based early data transmission EDT, uplink grant-free GF transmission, transmission based on a preconfigured uplink resource, and transmission based on a configured grant.

The embodiments may be applied to a terminal device in a connected state or an active state or may be applied to a terminal device in a disconnected state or an idle state.

The embodiments may be used for a random access preamble in a random access process, or may be used for various reference signals, for example, a DMRS sequence, a sounding reference signal (SRS), a channel state information reference signal (CSI-RS), and a phase tracking reference signal (PTRS).

Figure 3:
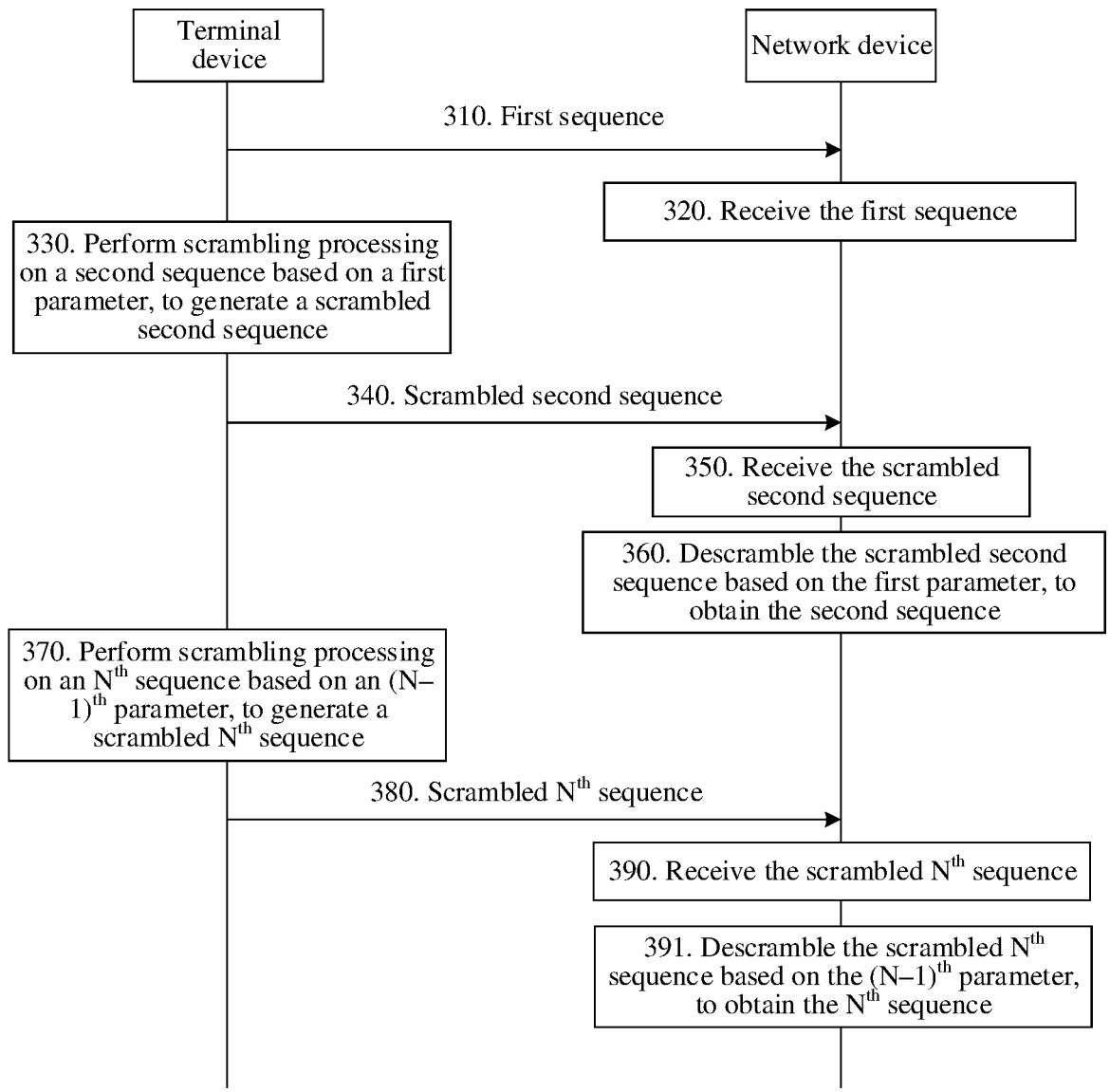
FIG. 3 is an interaction flowchart of a sequence sending method according to an embodiment.

FIG. 3 is an interaction flowchart of a sequence sending method according to an embodiment. In this method, 2-phase sequence sending is increased to multiple-phase sequence sending, so that a total quantity of available sequences is further increased.

310: A terminal device selects a first sequence from a resource pool, and the terminal device sends, in a first time period, the first sequence to a network device, where the first sequence is determined based on a first parameter. The network device is an entity configured to send/receive a signal, for example, a base station.

Optionally, before the terminal device sends the first sequence to the network device, the terminal device receives indication information sent by the network device, and the terminal device selects the first sequence from the resource pool based on the indication information sent by the network device. Optionally, the first sequence may alternatively be randomly selected by the terminal device or may be selected according to another rule.

The first sequence may be a ZC sequence, or may be any one of the following sequences, or may be another sequence:

(1) longest linear shift register m sequence, where the longest linear shift register m sequence with a length of $2^m-1$ (m>1) may be defined as $c(n)=(-1)^{Tr(a^n)}$, where $$Tr(x) = \sum_{l=0}^{m-1} x^{2^l};$$

an example is x(ī+5)=(x(ī+2)+x(ī))mod 2, and 0≤ī≤57, where x(0)=0, x(1)=0, x(2)=0, x(3)=0, x(4)=1;
(2) pseudo noise (PN) sequence, where the PN sequence applied in a 5G NR system is generated by a Gold sequence with a length of 31;

$$c(n)=(x_1(n+N_C)+x_2(n+N_C))\mod 2$$

$$x_1(n+31)=(x_1(n+3)+x_1(n))\mod 2$$

$$x_2(n+31)=(x_2(n+3)+x_2(n+2)+x_2(n+1)+x_2(n))\mod 2$$

c(n) is a generated PN sequence, a length of c(n) is $M_{PN}$, where n=0, 1, ..., $M_{PN}-1$, and $N_C$=160; an initial value of a first m sequence $x_1(n)$ is $x_1(0)=1$, $x_1(n)=0$, n=1, 2, ..., 30, and an initial value of a second m sequence $x_2(n)$ is $c_{init}=\Sigma_{i=0}^{30}x_2(i)\cdot 2^i$;
(3) discrete Fourier transform (DFT) sequence, where the DFT sequence may be considered as a row or a column in a DFT matrix; an element of the DFT matrix is defined as $x_{pq}=\omega^{-pq}$, and $\omega=e^{-2\pi i/N}$, where N is a sequence length, i is an imaginary unit, and $i^2=-1$;
(4) Alltop sequence, where the Alltop sequence is defined as $c(\gamma,\omega)=g(\gamma,\omega)$, for example, $$g(\gamma, \omega) = e^{-j2\pi \frac{(n+\omega)^3+\gamma n}{L}},$$

where 0≤n≤L−1 and 0≤w≤L−1; and
(5) Gold sequence, where the Gold sequence is addition modulo 2 of two longest linear shift register m sequences.

320: The network device receives, in the first time period, the first sequence sent by the terminal device.

330: The terminal device selects a second sequence from the resource pool and performs scrambling processing on the second sequence based on the first parameter used for determining the first sequence, to generate a scrambled second sequence. The second sequence may be selected by the terminal device based on indication information sent by the network device, or may be randomly selected by the terminal device, or may be selected according to another rule. The second sequence may be any one of a ZC sequence, an m sequence, a pseudo noise (PN) sequence, a discrete Fourier transform (DFT) sequence, an Alltop sequence, or a Gold sequence, or may be another sequence.

Optionally, the terminal device generates a first scrambling sequence based on the first parameter; and the terminal device performs scrambling processing on the second sequence based on the first scrambling sequence, to generate the scrambled second sequence. The first scrambling sequence may be any one of a ZC sequence, an m sequence, a pseudo noise (PN) sequence, a discrete Fourier transform (DFT) sequence, an Alltop sequence, or a Gold sequence, or may be another sequence.

For example, if the first sequence selected by the terminal device from the resource pool is a ZC sequence, the first parameter may be a root sequence index, a cyclic shift index, a cyclic shift interval, or a cyclic shift value. If the first sequence is an m sequence or a Gold sequence, the first parameter may be a cyclic shift value. If the first sequence is an Alltop sequence, the first parameter may be γ or ω.

A method used by the terminal device to generate the first scrambling sequence S based on a first parameter x includes: generating parameter information y=f(x) of the first scrambling sequence $S_1$ based on the first parameter x, where f represents a function, for example, y=x. x may be the foregoing parameter information. For example, when the first scrambling sequence is a ZC sequence, y may be any parameter of a root sequence index, a cyclic shift index, a cyclic shift interval, or a cyclic shift value; when the first scrambling sequence is a PN sequence, y may be cyclic shift information, for example, any parameter information of a cyclic shift index, a cyclic shift interval, or a cyclic shift value; when the first scrambling sequence is an Alltop sequence, y may be γ or ω; and when the first scrambling sequence is an m sequence or a Gold sequence, y may be cyclic shift information, for example, any parameter information of a cyclic shift index, a cyclic shift interval, or a cyclic shift value.

The terminal device performs scrambling processing on the second sequence based on the first scrambling sequence. An implementation method includes: multiplying the first scrambling sequence by a corresponding element of the second sequence, to generate the scrambled second sequence.

340: The terminal device sends, in a second time period, the scrambled second sequence to the network device.

350: The network device receives the scrambled second sequence sent by the terminal device.

360: The network device descrambles the scrambled second sequence based on the first parameter, to obtain the second sequence.

The network device determines, based on the first sequence sent by the terminal device, the first parameter used for determining the first sequence, and generates a first descrambling sequence based on the first parameter. The first descrambling sequence and the first scrambling sequence are a same sequence. The network device descrambles the scrambled second sequence based on the first descrambling sequence, to obtain the unscrambled second sequence.

370: The terminal device selects an $N^{th}$ sequence from the resource pool and performs scrambling processing on the $N^{th}$ sequence based on an $(N-1)^{th}$ parameter used for determining an $(N-1)^{th}$ sequence, to generate a scrambled $N^{th}$ sequence, where N is an integer greater than 2. In other words, the terminal device separately sends, in at least three time periods, at least three sequences to the network device. The $N^{th}$ sequence may be selected by the terminal device based on indication information sent by the network device, or may be randomly selected by the terminal device, or may be selected according to another rule. The $N^{th}$ sequence may be any one of a ZC sequence, an m sequence, a pseudo noise (PN) sequence, a discrete Fourier transform (DFT) sequence, an Alltop sequence, or a Gold sequence, or may be another sequence.

Optionally, the terminal device generates an $(N-1)^{th}$ scrambling sequence based on the $(N-1)^{th}$ parameter; and the terminal device performs scrambling processing on the $N^{th}$ sequence based on the $(N-1)^{th}$ scrambling sequence, to generate the scrambled $N^{th}$ sequence. The (N−1)th scrambling sequence may be any one of a ZC sequence, an m sequence, a pseudo noise (PN) sequence, a discrete Fourier transform (DFT) sequence, an Alltop sequence, or a Gold sequence, or may be another sequence.

380: The terminal device sends, in an $N^{th}$ time period, the scrambled $N^{th}$ sequence to the network device.

390: The network device receives the scrambled $N^{th}$ sequence sent by the terminal device.

391: The network device descrambles the scrambled $N^{th}$ sequence based on the (N−1)th parameter used for determining the $(N-1)^{th}$ sequence, to obtain the $N^{th}$ sequence.

The network device determines, based on the $(N-1)^{th}$ sequence sent by the terminal device, the $(N-1)^{th}$ parameter used for determining the $(N-1)^{th}$ sequence, and generates an $(N-1)$th descrambling sequence based on the $(N-1)^{th}$ parameter. The $(N-1)^{th}$ descrambling sequence and the $(N-1)^{th}$ scrambling sequence are a same sequence. The network device descrambles the scrambled $N^{th}$ sequence based on the $(N-1)^{th}$ descrambling sequence, to obtain the unscrambled $N^{th}$ sequence.

After receiving and obtaining a combination of the first sequence, the second sequence, and the $N^{th}$ sequence that are sent by the terminal device, the network device performs a subsequent operation for the combination. Optionally, the network device sends a random access response RAR message to the terminal device, and the terminal device receives the RAR message sent by the network device and sends data to the network device based on a time-frequency resource indicated in the RAR message.

It should be understood that different time periods may be different time units, for example, different symbols, slots, subframes, and radio frames. The different time periods may be consecutive or inconsecutive in time. For example, each phase has one orthogonal frequency division multiplexing (OFDM) symbol, and two time periods may be two adjacent consecutive OFDM symbols or may be two non-adjacent OFDM symbols.

It should be understood that the second sequence and the $N^{th}$ sequence may be selected by the terminal device in the first time period or before the first time period or may be separately selected by the terminal device in the second time period and the $N^{th}$ time period. This is not limited.

In the embodiments, the terminal device may separately send at least three sequences, including the first sequence, the second sequence, and the $N^{th}$ sequence, to the network device in different time periods. The first sequence, the second sequence, and the $N^{th}$ sequence are randomly selected by the terminal device from the resource pool. If a total quantity of available sequences in the resource pool is Q, a quantity of available sequence combinations is at least $Q^3$. Therefore, the total quantity of available sequences is increased, and a probability of a sequence conflict can be reduced.

For example, there are three time periods. It is assumed that the network device allocates three time units to the terminal device, and the three time units are used by the terminal device to send a random access preamble sequence. It is assumed that Q sequences included in a sequence resource pool are ZC sequences $x_{u,v}(n)$, $0 \leq n \leq N-1$, where n is a sequence length, u is a root sequence index, and v is a cyclic shift index; and a used scrambling sequence is an m sequence, $c_w(n)=c_0(n+w)$, where w is a cyclic shift value, and $c_0(n+w)$ is a period extension of an m sequence with a length of $2m-1$, where $m=\log_2(N+1)$. A sequence sending process is as follows.

Step 1: The terminal device randomly selects a preamble-1 from a preamble resource pool. Assuming that a cyclic shift index of a selected sequence is 2, the sequence may be represented as $x_{u,2}(n)$, and the terminal device sends, in a first time unit, the sequence $o_1(n)=x_{u,2}(n)$ to the network device.

Step 2: The network device receives the sequence $o_1(n)$ sent by the terminal device.

Step 3: The terminal device randomly selects a preamble-2 from the preamble resource pool. Assuming that a cyclic shift index of a selected sequence is 30, the sequence may be represented as $x_{u,30}(n)$. The terminal device uses a cyclic shift index value 2 of the preamble-1 selected in step 1 as a cyclic shift value of an m sequence, to generate a first scrambling sequence $s_1(n)=c_2(n)$; the terminal device generates a sequence $o_2(n)=x_{u,30}(n)*c_2(n)$ based on the first scrambling sequence $s_1(n)$ and the sequence $x_{u,30}(n)$; and the terminal device sends, in a second time unit, the sequence $o_2(n)$ to the network device.

Step 4: The network device receives the sequence $o_2(n)$ sent by the terminal device, generates a first descrambling sequence (the first scrambling sequence) $s_1(n)=c_2(n)$ based on the cyclic shift index value of the sequence $x_{u,2}(n)$ sent by the terminal device in the first time unit, and the network device descrambles, based on the first descrambling sequence, the sequence $o_2(n)$ sent by the terminal device, to obtain the sequence $x_{u,30}(n)$.

Step 5: The terminal device randomly selects a preamble-3 from the preamble resource pool. Assuming that a cyclic shift index of a selected sequence is 4, the sequence may be represented as $x_{u,4}(n)$. The terminal device uses a cyclic shift index value 30 of the preamble-2 selected in step 3 as a cyclic shift value of the m sequence, to generate a second scrambling sequence $s_2(n)=c_{30}(n)$; the terminal device generates a sequence $o_3(n)=x_{u,4}(n)*c_{30}(n)$ based on the second scrambling sequence $s_2(n)$ and the sequence $x_{u,4}(n)$; and the terminal device sends, in a third time unit, the sequence $o_3(n)$ to the network device.

Step 6: The network device receives the sequence $o_3(n)$ sent by the terminal device, generates a second descrambling sequence (the second scrambling sequence) $s_2(n)=c_{30}(n)$ based on the cyclic shift index value of the sequence $x_{u,30}(n)$ sent by the terminal device in the second time unit, and the network device descrambles, based on the second descrambling sequence, the sequence $o_3(n)$ sent by the terminal device, to obtain the sequence $x_{u,4}(n)$.

The following provides a sequence sending instance in which the scrambling sequence is an Alltop sequence. For example, there are three time periods. It is assumed that the network device allocates three time units to the terminal device, and the three time units are used by the terminal device to send a random access preamble sequence. It is assumed that M sequences included in the sequence resource pool are ZC sequences $x_{u,v}(n)$, $0 \leq n \leq N-1$, where n is a sequence length, u is a root sequence index, and v is a cyclic shift index; and a used scrambling sequence is an Alltop sequence $c(\gamma,\omega)=g(\gamma,\omega)$, for example, $$g(\gamma, \omega) = e^{-j2\pi \frac{(n+\omega)^3 + \gamma n}{L}},$$

where $0 \leq n \leq L-1$ and $0 \leq \omega \leq L-1$. A sequence sending process is as follows.

Step 1: The terminal device randomly selects a preamble-1 from the preamble resource pool. Assuming that a cyclic shift index of a selected sequence is 2, the sequence may be represented as $x_{u,2}(n)$, and the terminal device sends the sequence $o_1(n)=x_{u,2}(n)$ in a first time unit.

Step 2: The network device receives the sequence $o_2(n)$ sent by the terminal device.

Step 3: The terminal device randomly selects a preamble-2 from the preamble resource pool. Assuming that a cyclic shift index of a selected sequence is 30, the sequence may be represented as $x_{u,30}(n)$. The terminal device determines $\omega$ and $\gamma$ of the Alltop sequence based on a root sequence index and/or a cyclic shift index value of the preamble-1 selected in step 1, for example, determines $\omega=2$ and $\gamma=u$, to generate a first scrambling sequence $s_1(n)=g_{u,2}(n)$; the terminal device generates a sequence $o_2(n)=x_{u,30}(n)*g_{u,2}(n)$ based on the first scrambling sequence $s_1(n)$ and the sequence $x_{u,30}(n)$; and the terminal device sends, in a second time unit, the sequence $o_2(n)$ to the network device.

Step 4: The network device receives the sequence $o_2(n)$ sent by the terminal device, generates a first descrambling sequence (the first scrambling sequence $s_1(n)=g_{u,2}(n)$ based on the root sequence index and/or the cyclic shift index value of the sequence $x_{u,2}(n)$ sent by the terminal device in the first time unit, and the network device descrambles, based on the first descrambling sequence, the sequence $o_2(n)$ sent by the terminal device, to obtain the sequence $x_{u,30}(n)$.

Step 5: The terminal device randomly selects a preamble-3 from the preamble resource pool. Assuming that a cyclic shift index of a selected sequence is 4, the sequence may be represented as $x_{u,4}(n)$. The terminal device determines $\omega$ and $\gamma$ of the Alltop sequence based on a root sequence index and/or a cyclic shift index value of the preamble-2 selected in step 3, for example, determines $\omega=30$ and $\gamma=u$, to generate a second scrambling sequence $s_2(n)=g_{u,30}(n)$; the terminal device generates a sequence $o_3(n)=x_{u,4}(n)*g_{u,30}(n)$ based on the second scrambling sequence $s_2(n)$ and the sequence $x_{u,4}(n)$; and the terminal device sends, in a third time unit, the sequence $o_3(n)$ to the network device.

Step 6: The network device receives the sequence $o_3(n)$ sent by the terminal device, generates a second descrambling sequence (the second scrambling sequence) $s2(n)=g_{u,30}(n)$ based on the root sequence index and/or the cyclic shift index value of the sequence $x_{u,30}(n)$ sent by the terminal device in the second time unit, and the network device descrambles, based on the second descrambling sequence, the sequence $o_3(n)$ sent by the terminal device, to obtain the sequence $x_{u,4}(n)$.

The network device may determine, based on detection statuses in the three time units, that the terminal device sends a combination of the preamble-1, the preamble-2, and the preamble-3, and the network device performs a subsequent operation for the combination, for example, send an RAR message.

It should be understood that a larger quantity of time periods allocated by the network device to the terminal device for sending sequences indicates a larger quantity of sequences sent by the terminal device to the network device, and a larger quantity of available sequence combinations.

Figure 4:
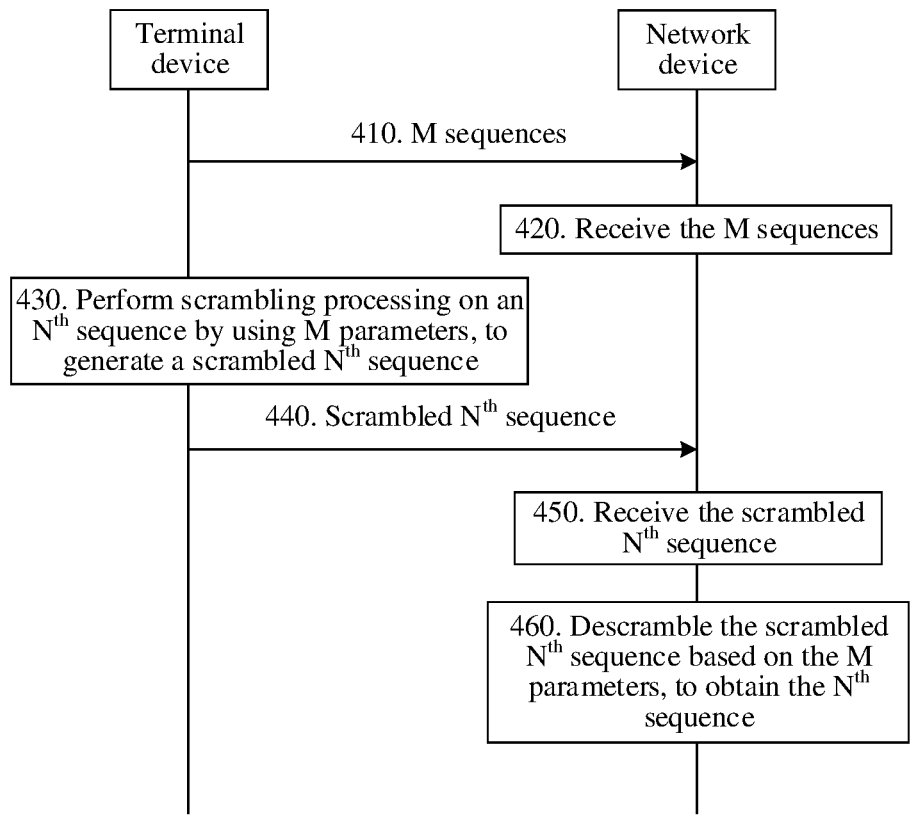
FIG. 4 is an interaction flowchart of another sequence sending method according to an embodiment.

FIG. 4 is an interaction flowchart of another sequence sending method according to an embodiment. This method may also increase a total quantity of available sequences.

410: A terminal device selects M sequences from a resource pool, where the M sequences include a first sequence to an $M^{th}$ longest linear shift register sequence, the M sequences are respectively determined based on M parameters, the M parameters correspond one-to-one to the M sequences, and M is an integer greater than or equal to 2. The terminal device sends, in a first time period, the M sequences to a network device.

Optionally, before the terminal device sends the M sequences to the network device, the terminal device receives indication information sent by the network device, and the terminal device selects the M sequences from the resource pool based on the indication information sent by the network device. Optionally, the M sequences may be randomly selected by the terminal device or may be selected according to another rule.

The M sequences are sequences of a same type. The type of the sequences may be any one of a ZC sequence, an m sequence, a pseudo noise (PN) sequence, a discrete Fourier transform (DFT) sequence, an Alltop sequence, or a Gold sequence, or may be another sequence.

420: The network device receives, in the first time period, the M sequences sent by the terminal device.

430: The terminal device selects an $N^{th}$ sequence from the resource pool and performs scrambling processing on the $N^{th}$ sequence based on the M parameters used for determining the M sequences, to generate a scrambled $N^{th}$ sequence, where N is equal to M+1. The $N^{th}$ sequence may be selected by the terminal device based on indication information sent by the network device, or may be randomly selected by the terminal device, or may be selected according to another rule. The $N^{th}$ sequence may be any one of a ZC sequence, an m sequence, a pseudo noise (PN) sequence, a discrete Fourier transform (DFT) sequence, an Alltop sequence, or a Gold sequence, or may be another sequence. It should be understood that the first sequence to the $M^{th}$ sequence, and the $N^{th}$ sequence may be sequences of a same type or may be sequences of different types.

Optionally, the terminal device generates an $N^{th}$ scrambling sequence based on the M parameters; and the terminal device performs scrambling processing on the $N^{th}$ sequence based on the $N^{th}$ scrambling sequence, to generate the scrambled $N^{th}$ sequence. The $N^{th}$ scrambling sequence may be any one of a ZC sequence, an m sequence, a pseudo noise (PN) sequence, a discrete Fourier transform (DFT) sequence, an Alltop sequence, or a Gold sequence, or may be another sequence.

The M parameters may be respective indexes of the M sequences in the resource pool. For example, if the M sequences selected by the terminal device from the resource pool are ZC sequences, the M parameters may be root sequence indexes, cyclic shift indexes, cyclic shift intervals, or cyclic shift values. If the M sequences are m sequences or Gold sequences, the M parameters may be cyclic shift values. If the M sequences are Alltop sequences, the M parameters may be $\gamma$ or $\omega$.

For example, M is equal to 2. A method used by the terminal device to generate the $N^{th}$ scrambling sequence based on the M parameters includes: generating parameter information $y=h(x1, x2)$ of the $N^{th}$ scrambling sequence $S_N$ based on a parameter x1 and a parameter x2, where h represents a function, for example, y is equal to a number of a combination (x1, x2) in all possible combinations. x1 and x2 may be the parameter information in the foregoing example. For example, when the $N^{th}$ scrambling sequence is a ZC sequence, y may be any parameter of a root sequence index, a cyclic shift index, a cyclic shift interval, or a cyclic shift value; when the $N^{th}$ scrambling sequence is a PN sequence, y may be cyclic shift information, for example, any parameter information of a cyclic shift index, a cyclic shift interval, or a cyclic shift value; when the $N^{th}$ scrambling sequence is an Alltop sequence, y may be $\gamma$ or $\omega$; and when the first scrambling sequence is an m sequence or a Gold sequence, y may be cyclic shift information, for example, any parameter information of a cyclic shift index, a cyclic shift interval, or a cyclic shift value.

The terminal device performs scrambling processing on the $N^{th}$ sequence based on the $N^{th}$ scrambling sequence. An implementation method includes: multiplying the $N^{th}$ scrambling sequence by a corresponding element of the $N^{th}$ sequence, to generate the scrambled $N^{th}$ sequence.

440: The terminal device sends, in a second time period, the scrambled $N^{th}$ sequence to the network device.

450: The network device receives the scrambled $N^{th}$ sequence sent by the terminal device.

460: The network device descrambles the scrambled $N^{th}$ sequence based on the M parameters, to obtain the $N^{th}$ sequence.

The network device determines, based on the M sequences sent by the terminal device, the M parameters used for determining the M sequences, and generates an $N^{th}$ descrambling sequence based on the M parameters. The $N^{th}$ descrambling sequence and the $N^{th}$ scrambling sequence are a same sequence. The network device descrambles the scrambled $N^{th}$ sequence, to obtain the unscrambled $N^{th}$ sequence.

After receiving and obtaining a combination of the first sequence to the $M^{th}$ sequence, and the $N^{th}$ sequence that are sent by the terminal device, the network device performs a subsequent operation for the combination. Optionally, the network device sends a random access response RAR message to the terminal device, and the terminal device receives the RAR message sent by the network device and sends data to the network device based on a time-frequency resource indicated in the RAR message.

It should be understood that different time periods may be different time units, for example, different symbols, slots, subframes, and radio frames. The different time periods may be consecutive or inconsecutive in time. For example, each phase has one orthogonal frequency division multiplexing (OFDM) symbol, and two time periods may be two adjacent consecutive OFDM symbols, or may be two non-adjacent OFDM symbols.

It should be understood that the $N^{th}$ sequence may be selected by the terminal device in the first time period or before the first time period or may be selected in the $N^{th}$ time period. This is not limited.

In the embodiments, the terminal device may send at least two sequences to the network device in the first time period and may send one sequence to the network device in the second time period. Sequences sent in a same time period are different, and sequences sent in different time periods may be the same or may be different. If a total quantity of available sequences in the resource pool is Q, a quantity of available sequence combinations is at least $Q^2(Q-1)$. Therefore, the total quantity of available sequences is increased, and a probability of a sequence conflict can be reduced.

For example, three sequences are sent. It is assumed that the network device allocates two time units to the terminal device, and the two time units are used by the terminal device to send a random access preamble sequence. The network device sends, in a first time unit, two sequences to the terminal device, and the network device sends, in a second time unit, one sequence to the terminal device. It is assumed that Q sequences included in a sequence resource pool 1 are all ZC sequences $x_{u,v}(n)$, $0 \le n \le N-1$, where n is a sequence length, u is a root sequence index, and v is a cyclic shift index; and a used scrambling sequence is an m sequence, $c_w(n) = c_0(n+w)$, where w is a cyclic shift value, and $c_0(n+w)$ is a period extension of an m sequence with a length of $2m-1$, where $m = \log_2(N+1)$. A sequence sending process is as follows.

Step 1: The terminal device randomly selects a preamble-1 and a preamble-2 from a preamble resource pool. Assuming that cyclic shifts of selected sequences are 2 and 5, the sequences are respectively represented as $x_{u,2}(n)$ and $x_{u,5}(n)$, and the terminal device sends, in the first time unit, the sequences $o_1(n)=x_{u,2}(n)$ and $o_2(n)=x_{u,5}(n)$ to the network device. Because the sequence resource pool includes the Q sequences, or Q cyclic shift indexes, it is assumed that a number of a cyclic index combination (2, 5) in all combinations are $index_{2,5}$.

Step 2: The network device receives the sequences $o_1(n)$ and $o_2(n)$ sent by the terminal device.

Step 3: The terminal device randomly selects a preamble-3 from the preamble resource pool. Assuming that a cyclic shift index of a selected sequence is 30, the sequence may be represented as $x_{u,30}(n)$. The terminal device uses the $index_{2,5}$ determined in step 1 as a cyclic shift value of the m sequence, to generate an $N^{th}$ scrambling sequence $s_N(n)=c_{index_{2,5}}(n)$; the terminal device generates a sequence $o_3(n)=x_{u,30}(n)*c_{index_{2,5}}(n)$ based on the $N^{th}$ scrambling sequence $s_N(n)$ and the sequence $x_{u,30}(n)$; and the terminal device sends, in the second time unit, the sequence $o_3(n)$ to the network device.

Step 4: The network device receives the sequence $o_3(n)$ sent by the terminal device, generates an $N^{th}$ descrambling sequence (the $N^{th}$ scrambling sequence) $s_N(n)=c_{index_{2,5}}(n)$ based on cyclic shift index values of the sequences $x_{u,2}(n)$ and $x_{u,5}(n)$ sent by the terminal device in the first time unit, and the network device descrambles, based on the $N^{th}$ descrambling sequence, the sequence $o_3(n)$ sent by the terminal device, to obtain the sequence $x_{u,30}(n)$.

The following provides a sequence sending instance in which the scrambling sequence is an Alltop sequence. For example, three sequences are sent. It is assumed that the network device allocates two time units to the terminal device, and the two time units are used by the terminal device to send a random access preamble sequence. The network device sends, in a first time unit, two sequences to the terminal device, and the network device sends, in a second time unit, one sequence to the terminal device. It is assumed that Q sequences included in the sequence resource pool 1 are all ZC sequences $x_{u,v}(n)$, $0 \le n \le N-1$, where n is a sequence length, u is a root sequence index, and v is a cyclic shift index; and a used scrambling sequence is an Alltop sequence $c(\gamma,\omega)=g(\gamma,\omega)$, for example, $$g(\gamma, \omega) = e^{-j2\pi \frac{(n+\omega)^3 + \gamma n}{L}},$$

where $0 \le n \le L-1$ and $0 \le \omega \le L-1$. A sequence sending process is as follows.

Step 1: The terminal device randomly selects a preamble-1 and a preamble-2 from the preamble resource pool. Assuming that cyclic shifts of selected sequences are 2 and 5, the sequences are respectively represented as $x_{u,2}(n)$ and $x_{u,5}(n)$, and the terminal device sends, in the first time unit, the sequences $o_1(n)=x_{u,2}(n)$ and $o_2(n)=x_{u,5}(n)$ to the network device. Because the sequence resource pool includes the Q sequences, or Q cyclic shift indexes, it is assumed that a number of a cyclic index combination (2, 5) in all combinations are $index_{2,5}$.

Step 2: The network device receives the sequences $o_1(n)$ and $o_2(n)$ sent by the terminal device.

Step 3: The terminal device randomly selects a preamble-3 from the preamble resource pool. Assuming that a cyclic shift index of a selected sequence is 30, the sequence may be represented as $x_{u,30}(n)$. The terminal device determines $\omega$ and $\gamma$ of the Alltop sequence based on the $index_{2,5}$ determined in step 1, for example, determines $\omega=_{index_{2,5}}$ and $\gamma=u$, to generate an $N^{th}$ scrambling sequence $s_N(n)=g_{u,index_{2,5}}(n)$; the terminal device generates a sequence $o_3(n)=x_{u,30}(n)*g_{u,index_{2,5}}(n)$ based on the $N^{th}$ scrambling sequence $s_1(n)$ and the sequence $x_{u,30}(n)$; and the terminal device sends, in the second time unit, the sequence $o_3(n)$ to the network device.

Step 4: The network device receives the sequence $o_3(n)$ sent by the terminal device, generates an $N^{th}$ descrambling sequence (the $N^{th}$ scrambling sequence) $s_N(n)=g_{u,index_{2,5}}(n)$ based on cyclic shift index values of the sequences $x_{u,2}(n)$ and $x_{u,5}(n)$ sent by the terminal device in the first time unit, and the network device descrambles, based on the $N^{th}$ descrambling sequence, the sequence $o_3(n)$ sent by the terminal device, to obtain the sequence $x_{u,30}(n)$.

The network device may determine, based on detection statuses in the two time units, that the terminal device sends a combination of the preamble-1, the preamble-2, and the preamble-3, and the network device performs a subsequent operation for the combination, for example, send an RAR message.

It should be understood that the terminal device may alternatively send, in the first time period, a plurality of sequences to the network device; or send, in the second time period, one or more sequences to the network device; or send, in a third time period, one sequence to the network device; or the like. This is not limited in the embodiments.

Figure 5:
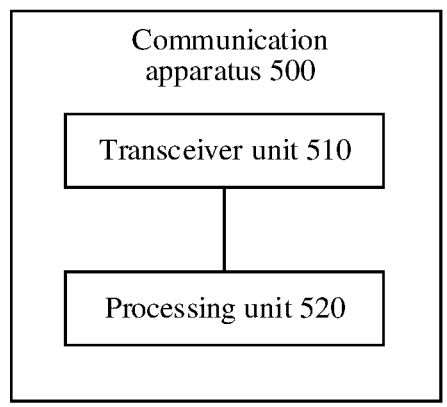
FIG. 5 is a schematic block diagram of a communication apparatus according to an embodiment.

An embodiment may provide a communication apparatus. FIG. 5 is a schematic block diagram of a communication apparatus 500 according to this embodiment. The apparatus may be used in the terminal device in the method embodiment in FIG. 3.

The communication apparatus 500 includes a transceiver unit 510 and a processing unit 520. The transceiver unit 510 is configured to send, in a first time period, a first sequence to a network device, where the first sequence is determined based on a first parameter;

the processing unit 520 is configured to perform scrambling processing on a second sequence based on the first parameter, to generate a scrambled second sequence;

the transceiver unit 510 is further configured to send, in a second time period, the scrambled second sequence to the network device;

the processing unit 520 is further configured to perform scrambling processing on an $N^{th}$ sequence based on an $(N-1)^{th}$ parameter, to generate a scrambled $N^{th}$ sequence, where an $(N-1)^{th}$ sequence is determined based on the $(N-1)^{th}$ parameter, and N is an integer greater than 2; and the transceiver unit 510 is further configured to send, in an $N^{th}$ time period, the scrambled $N^{th}$ sequence to the network device.

Optionally, the transceiver unit 510 is further configured to receive indication information sent by the network device; and the processing unit 520 is further configured to select the first sequence, the second sequence, the $(N-1)^{th}$ sequence, and the $N^{th}$ sequence from a resource pool based on the indication information.

Optionally, the processing unit 520 may be configured to: generate a first scrambling sequence based on the first parameter; and perform scrambling processing on the second sequence based on the first scrambling sequence, to generate the scrambled second sequence.

Optionally, the transceiver unit 510 is further configured to receive a random access response message sent by the network device.

Optionally, the first sequence, the second sequence, the $N^{th}$ sequence, and the first descrambling sequence are any one of the following sequences: a Zadoff-Chu (ZC) sequence, an m sequence, a pseudo noise (PN) sequence, a discrete Fourier transform (DFT) sequence, an Alltop sequence, or a Gold sequence.

Figure 6:
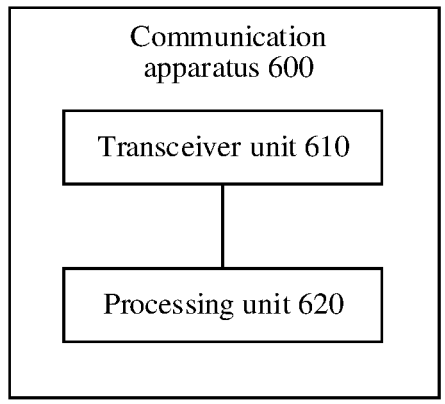
FIG. 6 is a schematic block diagram of another communication apparatus according to an embodiment.

An embodiment may provide another communication apparatus. FIG. 6 is a schematic block diagram of a communication apparatus 600 according to this embodiment. The apparatus may be used in the network device in the method embodiment in FIG. 3. The communication apparatus 600 includes a transceiver unit 610 and a processing unit 620. The transceiver unit 610 is configured to receive, in a first time period, a first sequence sent by a terminal device, where the first sequence is determined based on a first parameter;

the transceiver unit 610 is further configured to receive, in a second time period, a scrambled second sequence sent by the terminal device, where the scrambled second sequence is a sequence obtained by performing, by the terminal device, scrambling processing on a second sequence based on the first parameter;

the processing unit 620 is configured to descramble the scrambled second sequence based on the first parameter, to obtain the second sequence;

the transceiver unit 610 is further configured to receive, in an $N^{th}$ time period, a scrambled $N^{th}$ sequence sent by the terminal device, where the scrambled $N^{th}$ sequence is a sequence obtained by performing, by the terminal device, scrambling processing on an $N^{th}$ sequence based on an $(N-1)^{th}$ parameter, an $(N-1)^{th}$ sequence is determined based on the $(N-1)^{th}$ parameter, and N is an integer greater than 2; and the processing unit 620 is further configured to descramble the scrambled $N^{th}$ sequence based on the $(N-1)^{th}$ parameter, to obtain the $N^{th}$ sequence.

Optionally, the transceiver unit 610 is further configured to send indication information to the terminal device, where the indication information indicates the terminal device to select the first sequence, the second sequence, the $(N-1)^{th}$ sequence, and the $N^{th}$ sequence from a resource pool.

Optionally, the processing unit 620 may be configured to: generate a first descrambling sequence based on the first parameter; and descramble the scrambled second sequence based on the first descrambling sequence, to obtain the second sequence.

Optionally, the transceiver unit 610 is further configured to send a random access response message to the terminal device based on the first sequence, the second sequence, and the $N^{th}$ sequence.

Optionally, the first sequence, the second sequence, the $N^{th}$ sequence, and the first descrambling sequence are any one of the following sequences: a Zadoff-chu ZC sequence, an m sequence, a pseudo noise (PN) sequence, a discrete Fourier transform (DFT) sequence, an Alltop sequence, or a Gold sequence.

Figure 7:
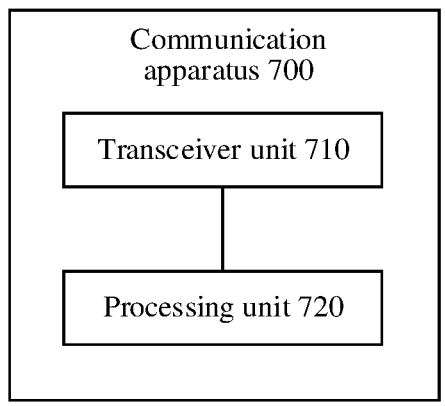
FIG. 7 is a schematic block diagram of another communication apparatus according to an embodiment.

An embodiment may provide another communication apparatus. FIG. 7 is a schematic block diagram of a communication apparatus 700 according to this embodiment. The apparatus may be used in the terminal device in the method embodiment in FIG. 4. The communication apparatus 700 includes a transceiver unit 710 and a processing unit 720. The transceiver unit 710 is configured to send, in a first time period, M sequences to a network device, where the M sequences include a first sequence to an $M^{th}$ longest linear shift register sequence, the M sequences are respectively determined based on M parameters, the M parameters correspond one-to-one to the M sequences, and M is an integer greater than or equal to 2;

the processing unit 720 is configured to perform scrambling processing on an $N^{th}$ sequence based on the M parameters, to generate a scrambled $N^{th}$ sequence, where N is equal to M+1; and the transceiver unit 710 is further configured to send, in a second time period, the scrambled $N^{th}$ sequence to the network device.

Optionally, the transceiver unit 710 is further configured to receive indication information sent by the network device; and the processing unit 720 is further configured to select the M sequences and the $N^{th}$ sequence from a resource pool based on the indication information.

Optionally, the processing unit 720 may be configured to: generate an $N^{th}$ scrambling sequence based on the M parameters; and perform scrambling processing on the $N^{th}$ sequence based on the $N^{th}$ scrambling sequence, to generate the scrambled $N^{th}$ sequence.

Optionally, the transceiver unit 710 is further configured to receive a random access response message sent by the network device.

Optionally, the M sequences, the $N^{th}$ sequence, and the $N^{th}$ scrambling sequence are any one of the following sequences: a Zadoff-Chu (ZC) sequence, an m sequence, a pseudo noise (PN) sequence, a discrete Fourier transform (DFT) sequence, an Alltop sequence, or a Gold sequence.

Figure 8:
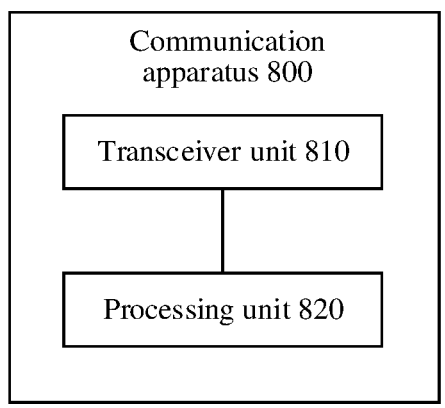
FIG. 8 is a schematic block diagram of another communication apparatus according to an embodiment.

An embodiment may provide another communication apparatus. FIG. 8 is a schematic block diagram of a communication apparatus 800 according to this embodiment. The apparatus may be used in the network device in the method embodiment in FIG. 4. The communication apparatus 800 includes a transceiver unit 810 and a processing unit 820.

The transceiver unit 810 is configured to receive, in a first time period, M sequences sent by a terminal device, where the M sequences include a first sequence to an $M^{th}$ longest linear shift register sequence, the M sequences are respectively determined based on M parameters, the M parameters correspond one-to-one to the M sequences, and M is an integer greater than or equal to 2;

the transceiver unit 810 is further configured to receive, in a second time period, a scrambled $N^{th}$ sequence sent by the terminal device, where the scrambled $N^{th}$ sequence is a sequence obtained by performing, by the terminal device, scrambling processing on an $N^{th}$ sequence based on the M parameters, where N is equal to M+1; and the processing unit 820 is configured to descramble the scrambled $N^{th}$ sequence based on the M parameters, to obtain the $N^{th}$ sequence.

Optionally, the transceiver unit 810 is further configured to send indication information to the terminal device, where the indication information indicates the terminal device to select the M sequences and the $N^{th}$ sequence from a resource pool.

Optionally, the processing unit 820 may be configured to: generate an $N^{th}$ descrambling sequence based on the M parameters; and descramble the scrambled $N^{th}$ sequence based on the $N^{th}$ descrambling sequence, to obtain the $N^{th}$ sequence.

Optionally, the transceiver unit 810 is further configured to send a random access response message to the terminal device based on the M sequences and the $N^{th}$ sequence.

Optionally, the M sequences, the $N^{th}$ sequence, and the $N^{th}$ descrambling sequence are any one of the following sequences: a Zadoff-Chu (ZC) sequence, an m sequence, a pseudo noise (PN) sequence, a discrete Fourier transform (DFT) sequence, an Alltop sequence, or a Gold sequence.

Figure 9:
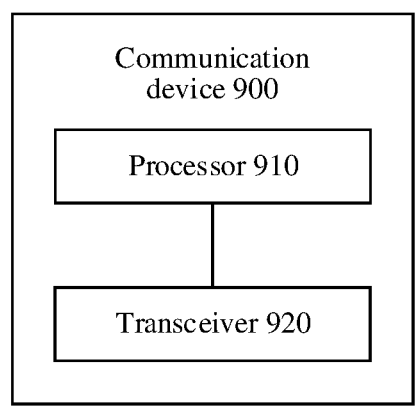
FIG. 9 is a schematic block diagram of a communication device according to an embodiment.

An embodiment may provide a communication device 900. FIG. 9 is a schematic block diagram of the communication device 900 according to this embodiment.

The device 900 includes a processor 910 and a transceiver 920. The transceiver 920 is configured to: receive computer code or instructions and transmit the computer code or the instructions to the processor 910. The processor 910 runs the computer code or the instructions, to implement the method in any possible implementation in embodiments.

The processor 910 may be an integrated circuit chip and may have a signal processing capability. In an implementation process, steps in the foregoing method embodiments can be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments. The general-purpose processor may be a microprocessor, or the processor may be any conventional processor or the like. The steps of the method disclosed with reference to the embodiments may be directly performed by a hardware decoding processor or may be performed by using a combination of hardware in a decoding processor and a software module. The software module may be located in a mature storage medium in the art, for example, a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

Figure 10:
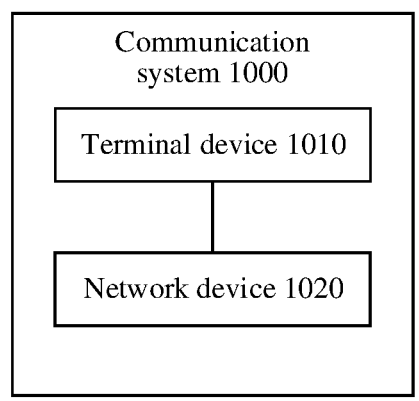
FIG. 10 is a schematic block diagram of a communication system according to an embodiment.

An embodiment may provide a communication system 1000. The communication system includes a terminal device 1010 and a network device 1020 in the sequence sending method provided in the embodiments. FIG. 10 is a schematic block diagram of the communication system 1000 according to an embodiment.

An embodiment may further provide a non-transitory computer-readable storage medium. The non-transitory computer-readable storage medium stores a computer program configured to implement the method in the foregoing method embodiments. When the computer program is run on a computer, the computer is enabled to implement the method in the foregoing method embodiments.

In addition, the term "and/or" describes only an association relationship for describing associated objects and represents that three relationships may exist. For example, A and/or B may represent the following three cases: Only A exists, both A and B exist, and only B exists. In addition, the character "/" generally indicates an "or" relationship between the associated objects. The term "at least one" may represent "one" and "two or more". For example, at least one of A, B, and C may indicate the following seven cases: only A exists, only B exists, only C exists, both A and B exist, both A and C exist, both C and B exist, and A, B, and C exist.

A person of ordinary skill in the art may be aware that, in combination with the examples described in embodiments, units and algorithm steps may be implemented by electronic hardware or a combination of computer software and electronic hardware. Whether the functions are performed by hardware or software depends on particular applications and constraint conditions of the solutions. A person skilled in the art may use different methods to implement the described functions for each particular application, but it should not be considered that the implementation goes beyond the scope of the embodiments.

A person skilled in the art may clearly learn that, for the purpose of convenient and brief descriptions, for a working process of the foregoing system, apparatuses, and units, refer to a corresponding process in the foregoing method embodiments. Details are not described herein again.

In the several embodiments, it should be understood that the disclosed system, apparatuses, and methods may be implemented in other manners. For example, the described apparatus embodiment is merely an example. For example, unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the embodiments may be implemented in a form of a software product. The computer software product is stored in a storage medium, and includes several instructions for instructing a computer device (which may be a personal computer, a server, a network device, or the like) to perform all or some of the steps of the method described in the embodiments. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations, but are not intended to limit the scope of the embodiments. Any variation or replacement readily figured out by a person skilled in the art shall fall within the scope of the embodiments.

What is claimed is:

1. A sequence sending method, applied to random access of a terminal device, wherein the method comprises:
   sending, by the terminal device in a first time period, a first sequence to a network device, wherein the first sequence is determined based on a first parameter;
   performing, by the terminal device, scrambling processing on a second sequence based on the first parameter, to generate a scrambled second sequence;
   sending, by the terminal device in a second time period, the scrambled second sequence to the network device;
   performing, by the terminal device, scrambling processing on an $N^{th}$ sequence based on an $(N-1)^{th}$ parameter, to generate a scrambled $N^{th}$ sequence, wherein an $(N-1)^{th}$ sequence is determined based on the $(N-1)^{th}$ parameter, and N is an integer greater than 2; and
   sending, by the terminal device in an $N^{th}$ time period, the scrambled $N^{th}$ sequence to the network device.

2. The sequence sending method according to claim 1, wherein before sending, by the terminal device, the first sequence to the network device, the method further comprises:
   receiving, by the terminal device, indication information sent by the network device; and
   selecting, by the terminal device, the first sequence, the second sequence, the $(N-1)^{th}$ sequence, and the $N^{th}$ sequence from a resource pool based on the indication information.

3. The sequence sending method according to claim 1, wherein performing, by the terminal device, scrambling processing on the second sequence based on the first parameter, to generate the scrambled second sequence further comprises:
   generating, by the terminal device, a first scrambling sequence based on the first parameter; and
   performing, by the terminal device, scrambling processing on the second sequence based on the first scrambling sequence, to generate the scrambled second sequence.

4. The sequence sending method according to claim 1, further comprising:
   receiving, by the terminal device, a random access response message sent by the network device.

5. The sequence sending method according to claim 1, wherein the first sequence, the second sequence, the $N^{th}$ sequence, and the first scrambling sequence are any one of the following sequences:
   a Zadoff Chu (ZC) sequence, a longest linear shift register m sequence, a pseudo noise (PN) sequence, a discrete Fourier transform (DFT) sequence, an Alltop sequence, or a Gold sequence.

6. The device according to claim 1, wherein the non-transitory computer-readable storage medium further comprises instructions to:
   receive, by the terminal device, indication information sent by the network device; and
   select, by the terminal device, the first sequence, the second sequence, the $(N-1)^{th}$ sequence, and the $N^{th}$ sequence from a resource pool based on the indication information.

7. The device according to claim 1, wherein the non-transitory computer-readable storage medium further comprises instructions to:
   generate a first scrambling sequence based on the first parameter; and
   perform scrambling processing on the second sequence based on the first scrambling sequence, to generate the scrambled second sequence.

8. The device according to claim 1, wherein the non-transitory computer-readable storage medium further comprises instructions to:
   receive a random access response message sent by the network device.

9. The device according to claim 1, wherein the first sequence, the second sequence, the $N^{th}$ sequence, and the first scrambling sequence are any one of the following sequences:
   a Zadoff Chu (ZC) sequence, a longest linear shift register m sequence, a pseudo noise (PN) sequence, a discrete Fourier transform (DFT) sequence, an Alltop sequence, or a Gold sequence.

10. A sequence sending method, applied to random access of a terminal device, wherein the method comprises:

receiving, by a network device in a first time period, a first sequence sent by the terminal device, wherein the first sequence is determined based on a first parameter;

receiving, by the network device in a second time period, a scrambled second sequence sent by the terminal device, wherein the scrambled second sequence is a sequence obtained by performing, by the terminal device, scrambling processing on a second sequence based on the first parameter;

descrambling, by the network device, the scrambled second sequence based on the first parameter, to obtain the second sequence;

receiving, by the network device in an $N^{th}$ time period, a scrambled $N^{th}$ sequence sent by the terminal device, wherein the scrambled $N^{th}$ sequence is a sequence obtained by performing, by the terminal device, scrambling processing on an $N^{th}$ sequence based on an $(N-1)^{th}$ parameter, an $(N-1)^{th}$ sequence is determined based on the $(N-1)^{th}$ parameter, and N is an integer greater than 2; and descrambling, by the network device, the scrambled $N^{th}$ sequence based on the $(N-1)^{th}$ parameter, to obtain the $N^{th}$ sequence.

11. The sequence sending method according to claim 10, wherein before receiving, by the network device, the first sequence sent by the terminal device, the method further comprises:

sending, by the network device, indication information to the terminal device, wherein the indication information indicates the terminal device to select the first sequence, the second sequence, the $(N-1)^{th}$ sequence, and the $N^{th}$ sequence from a resource pool.

12. The sequence sending method according to claim 10, wherein descrambling, by the network device, the scrambled second sequence based on the first parameter, to obtain the second sequence further comprises:

generating, by the network device, a first descrambling sequence based on the first parameter; and descrambling, by the network device, the scrambled second sequence based on the first descrambling sequence, to obtain the second sequence.

13. The sequence sending method according to claim 10, further comprising:

sending, by the network device, a random access response message to the terminal device based on the first sequence, the second sequence, and the $N^{th}$ sequence.

14. The sequence sending method according to claim 10, wherein the first sequence, the second sequence, the $N^{th}$ sequence, and the first descrambling sequence are any one of the following sequences:

a Zadoff Chu (ZC) sequence, a longest linear shift register m sequence, a pseudo noise (PN) sequence, a discrete Fourier transform (DFT) sequence, an Alltop sequence, or a Gold sequence.

15. A device, comprising:

a transceiver;

a processor; and a non-transitory computer-readable storage medium storing a program to be executed by the processor, the program including instructions to:

send, in a first time period, a first sequence to a network device, wherein the first sequence is determined based on a first parameter;

perform scrambling processing on a second sequence based on the first parameter, to generate a scrambled second sequence;

send, in a second time period, the scrambled second sequence to the network device;

perform scrambling processing on an $N^{th}$ sequence based on an $(N-1)^{th}$ parameter, to generate a scrambled $N^{th}$ sequence, wherein an $(N-1)^{th}$ sequence is determined based on the $(N-1)^{th}$ parameter, and N is an integer greater than 2; and send, in an $N^{th}$ time period, the scrambled $N^{th}$ sequence to the network device.

\* \* \* \* \*